(12) United States Patent
Katayama et al.

(10) Patent No.: US 6,466,884 B2
(45) Date of Patent: Oct. 15, 2002

(54) SURFACE TEXTURE MEASURING MACHINE AND METHOD OF CORRECTING A MEASURED VALUE FOR THE MACHINE

(75) Inventors: Minoru Katayama, Kure (JP); Kazushige Ishibashi, Kure (JP); Nobuyuki Hama, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/877,107

(22) Filed: Jun. 11, 2001

(65) Prior Publication Data

US 2001/0051857 A1 Dec. 13, 2001

(30) Foreign Application Priority Data

Jun. 13, 2000 (JP) ........................................ 2000-176291

(51) Int. Cl.[7] ................................................ G06F 19/00
(52) U.S. Cl. ..................................................... 702/104
(58) Field of Search ........................... 702/104, 94, 95, 702/33, 35, 36

(56) References Cited

U.S. PATENT DOCUMENTS 4,333,238 A    6/1982  McMurtry ................... 33/504
5,579,246 A  * 11/1996  Ebersbach et al. ............ 702/95
5,610,846 A    3/1997  Trapet et al. .................. 702/95

FOREIGN PATENT DOCUMENTS

GB              2 367 898      *  4/2002

* cited by examiner

Primary Examiner—Michael Nghiem
(74) Attorney, Agent, or Firm—Oliff & Berridge, PLC

(57) ABSTRACT

A surface texture measuring machine includes a vertical V-axis column D, a vertically movable table E, a horizontal X-axis guide 17 and a slider 18 disposed on the vertically movable table E, a probe C attached to the slider 18, a V-axis detector 13, a displacement detector 27, an X-axis detector 74, and a control device CPU. The control device CPU calculates the amount of a bending deformation in the X-axis direction at the height of the X-axis guide 17, from a height signal from the V-axis detector 13 and a displacement amount signal from the X-axis detector 74, and sets a value that is obtained by subtracting the bending deformation amount from the X-axis direction displacement amount, as an X-axis displacement in measurement.

10 Claims, 7 Drawing Sheets

SURFACE TEXTURE MEASURING MACHINE AND METHOD OF CORRECTING A MEASURED VALUE FOR THE MACHINE

BACKGROUND OF THE INVENTION

1. Field of the Invention

The present invention relates to a surface texture measuring machine of an object and a method of correcting a measured value for the machine, and more particularly to a large surface texture measuring machine which can measure an object of a large size or a high precision surface texture measuring machine and a method of correcting a measured value for the machine.

2. Description of the Related Art

As well known in the art, a surface texture measuring machine, which measures the surface roughness, the waviness, the roundness, or the two- or three-dimensional shape of an object, comprises a vertical V-axis column of high rigidity, a vertically movable table, a horizontal X-axis guide, a slider, and a minute detector. The vertical V-axis column upstands from a base of the machine. The vertically movable table is supported to be vertically movable with respect to the V-axis column. The horizontal X-axis guide and the slider which is slidable along the X-axis guide are disposed on the vertically movable table. The minute detector is attached to the slider to be in contact with the surface of the object.

Recently, in order to meet the needs for processed products which are highly precisely processed, a large surface texture measuring machine which can measure an object of a large size or a high precision surface texture measuring machine is requested. In the case where a surface texture measuring machine is simply enlarged or made highly precise, when precision of measurement which is equal to or higher than that of a small surface texture measuring machine is to be obtained, there arises a problem in that the components, i.e., the V-axis column, the X-axis guide, and the slider must be sufficiently enhanced in rigidity.

In a large surface texture measuring machine which can measure an object of a large size or a high precision surface texture measuring machine, namely, increased section moduli of the V-axis column, the X-axis guide, and the slider that must not be deformed cause the weight of the whole machine to be very increased. As a result, it is difficult to obtain a practical measuring machine.

SUMMARY OF THE INVENTION

In view of the above-discussed problem of a large surface texture measuring machine or a high precision surface texture measuring machine, it is an object of the invention to provide a surface texture measuring machine which is small and light or has high precision of measurement although the machine can measure a large object, and a method of correcting a measured value for the machine.

In order to attain the object, the invention proposes a method of correcting a measured value for a surface texture measuring machine comprising: a column which upstands from a base of the machine; a vertically movable table which is supported to be vertically movable (movable in V-axis direction) with respect to the column; a V-axis detector which detects a vertical displacement amount of the vertically movable table with respect to the column; a horizontal X-axis guide which is disposed on the vertically movable table; a slider which is guided along the X-axis guide and which has a Z-axis detector that detects a surface texture of an object; and an X-axis detector which detects a horizontal displacement amount of the slider with respect to the X-axis guide. The method comprises: an error calculation step of calculating amounts of errors in X-axis and Z-axis directions at a reference position of the vertically movable table, the errors being due to deformation of the column, from a height from a basal portion of the column to the reference position of the vertically movable table, the height being obtained by the V-axis detector, and a horizontal displacement amount from a reference position of the X-axis guide to a position of a center of gravity of the slider, the horizontal displacement amount being obtained by the X-axis detector; and an error correction step of correcting a detection result of one or both of the X-axis detector and the Z-axis detector, in accordance with the amounts of errors obtained in the error calculation step.

According to the invention, the object can be attained also by a surface texture measuring machine comprising: a column which upstands from a base of the machine; a vertically movable table which is supported to be vertically movable with respect to the column; a V-axis detector which detects a vertical displacement amount of the vertically movable table with respect to the column; a horizontal X-axis guide which is disposed on the vertically movable table; a slider which is guided along the X-axis guide, and which has a Z-axis detector that detects a surface texture of an object; and an X-axis detector which detects a horizontal displacement amount of the slider with respect to the X-axis guide. The machine further comprises a control device including: a height calculating section for receiving an output of the V-axis detector, and for calculating a height from a basal portion of the column to a reference position of the vertically movable table; a horizontal displacement amount calculating section for receiving an output of the X-axis detector, and for calculating a horizontal displacement amount from a reference position of the X-axis guide to a position of a center of gravity of the slider; an error amount calculating section for receiving outputs of the height calculating section and the horizontal displacement amount calculating section, and for calculating an amount of an error in one or both of X-axis and Z-axis directions at the reference position of the vertically movable table, the error being due to deformation of the column; and an error amount correcting section for correcting a detection result of one or both of the X-axis detector and the Z-axis detector, in accordance with an output of the error amount calculating section.

In the above-mentioned surface texture measuring machine:

1) a feed screw and a ball nut that move the slider in the X-axis direction may be disposed on the vertically movable table, a piano wire piece in which both the ends are fixed to the slider in a state where the wire piece is directed in the X-axis direction may be added to the slider, and a tip end portion of a connection pin that is integrated with the ball nut may be fixed to the position of the center of gravity of the slider in the X direction; and 2) the machine may further comprise a temperature detector disposed in the vicinity of one or all of the X-axis detector, the Z-axis detector, and the object, and control device may further include: a temperature error coefficient calculating section for obtaining a temperature error coefficient from an output of the temperature detector and specific temperature characteristics of the X-axis detector, the Z-axis detector, or the object in which the temperature detector is disposed; and a temperature error correcting section for correcting the detection result of one or all of the X-axis detector, the Z-axis detector, and the object, in accordance with an output of the temperature error coefficient calculating section.

DETAILED DESCRIPTION OF THE INVENTION

Hereinafter, the surface texture measuring machine of the invention which measures the two-dimensional shape of a large object will be described in detail with reference to the accompanying drawings.

Figure 1:
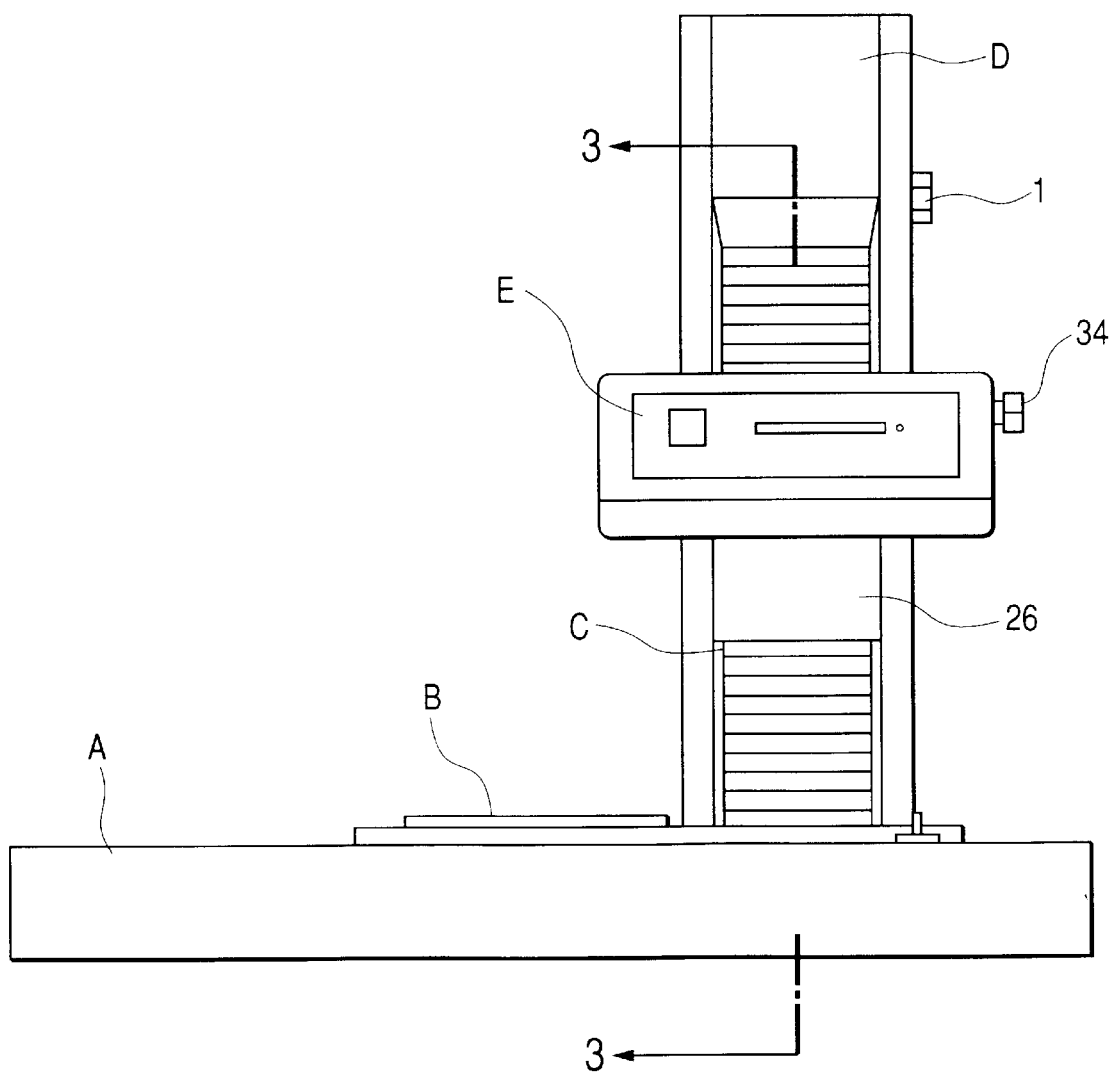
FIG. 1 is a front view of a surface texture measuring machine of the invention.

As shown in FIG. 1, the surface texture measuring machine of the invention is used for measuring the two-dimensional shape or the surface roughness by placing an object on a table B on the surface of a base A of the machine, and bringing the tip end of a probe C into contact with the surface of the object.

A V-axis column D which vertically elongates and has high rigidity is mounted on a right rear portion of the machine base A in FIG. 1. The V-axis column D is configured by a rod-like member which has high Young's modulus and a rectangular section shape, and which is made of ceramic. In the illustrated case, a vertically movable table E which is vertically moved by a V-axis drive motor (not shown) or a V-axis manual knob 1 of FIG. 1 is supported by the V-axis column D.

Figure 3:
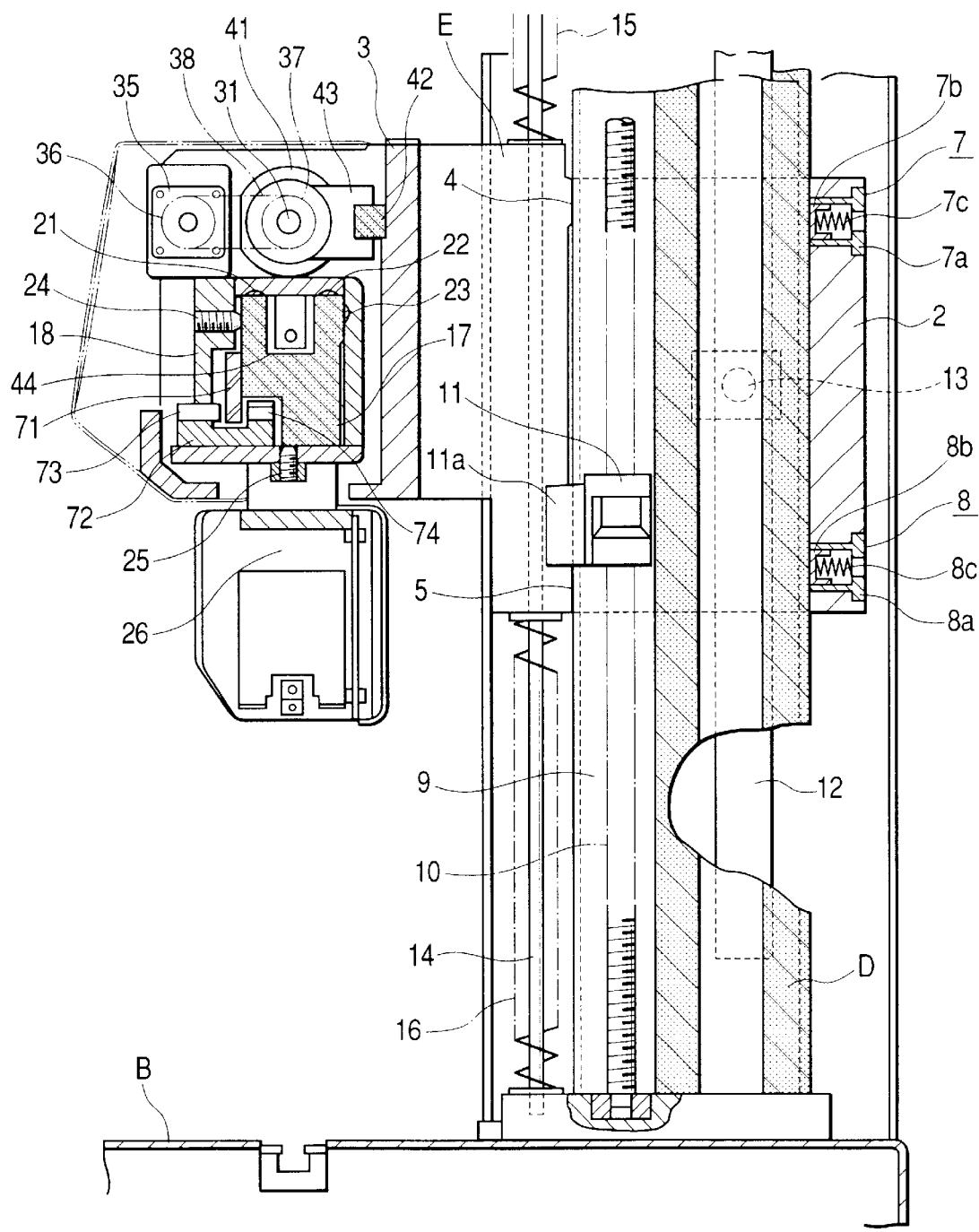
FIG. 3 is an enlarged section view of main portions of the surface texture measuring machine, taken along the line 3—3 of FIG. 1.

As seen from FIG. 3, the vertically movable table E comprises: a slide portion 2 and a movable table frame 3. The slide portion 2 has a rectangular frame-like structure which surrounds the V-axis column D. The movable table frame 3 projects substantially in front of the V-axis column D. A driving mechanism which will be described later is built into the movable table frame 3 in order to drive a detector having the probe C in the X-axis direction (the lateral direction in FIG. 1).

The slide portion 2 of the vertically movable table E comprises a plurality of talcs 4 and 5 which slidingly contact the front and left side faces of the V-axis column D that serve as reference guide faces. Push units 7 and 8 which press the talcs 4 and 5 against the corresponding reference guide faces are attached to the rear wall and the right side wall (not shown) of the slide portion 2. The push units 7 and 8 comprise attachment bushings 7a and 8a which are to be screwingly fixed to the slide portion 2, respectively. Pressing springs 7c and 8c for pressing press heads 7b and 8b against the surface of the V-axis column D are incorporated into the attachment bushings 7a and 8a, respectively.

A vertical V-axis feed screw 10 which is rotated by the V-axis drive motor is placed in a vertical accommodating groove 9 which is formed in the center of the front face of the V-axis column D. A bracket 11a of a feed nut 11 which is screwed with an intermediate portion of the V-axis feed screw 10 is firmly fixed to the slide portion 2.

In order to detect the vertical position of the vertically movable table E, a reflective scale 12 which elongates in the vertical directions (upward and downward directions) is fixed to the left side face of the V-axis column D. A V-axis detector head (V-axis detector 13) having a light emitting portion and a light receiving portion are fixed to the inner face of the slide portion 2 which faces the reflective scale 12.

The weight of the vertically movable table E including a driving mechanism which will be described later is balanced with forces of a pair of retainer springs 15 and 16 respectively fitted onto a guide rods 14 that is disposed in front of the V-axis column D. Therefore, a large bending moment in a forward or backward direction due to the weight of the vertically movable table E is prevented from acting on the V-axis column D.

Figure 2:
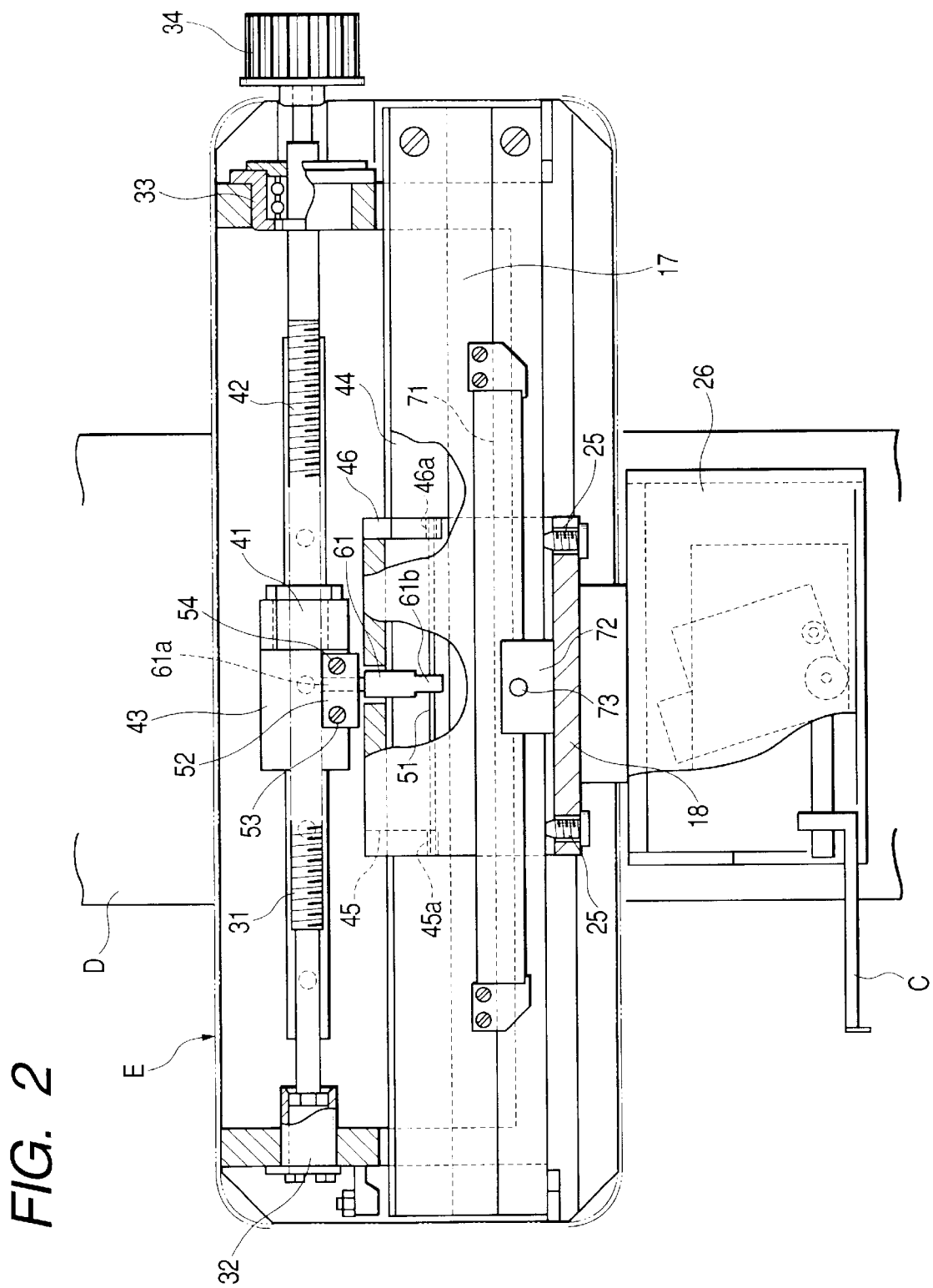
FIG. 2 is an enlarged section view of main portions of the surface texture measuring machine.
Figure 4:
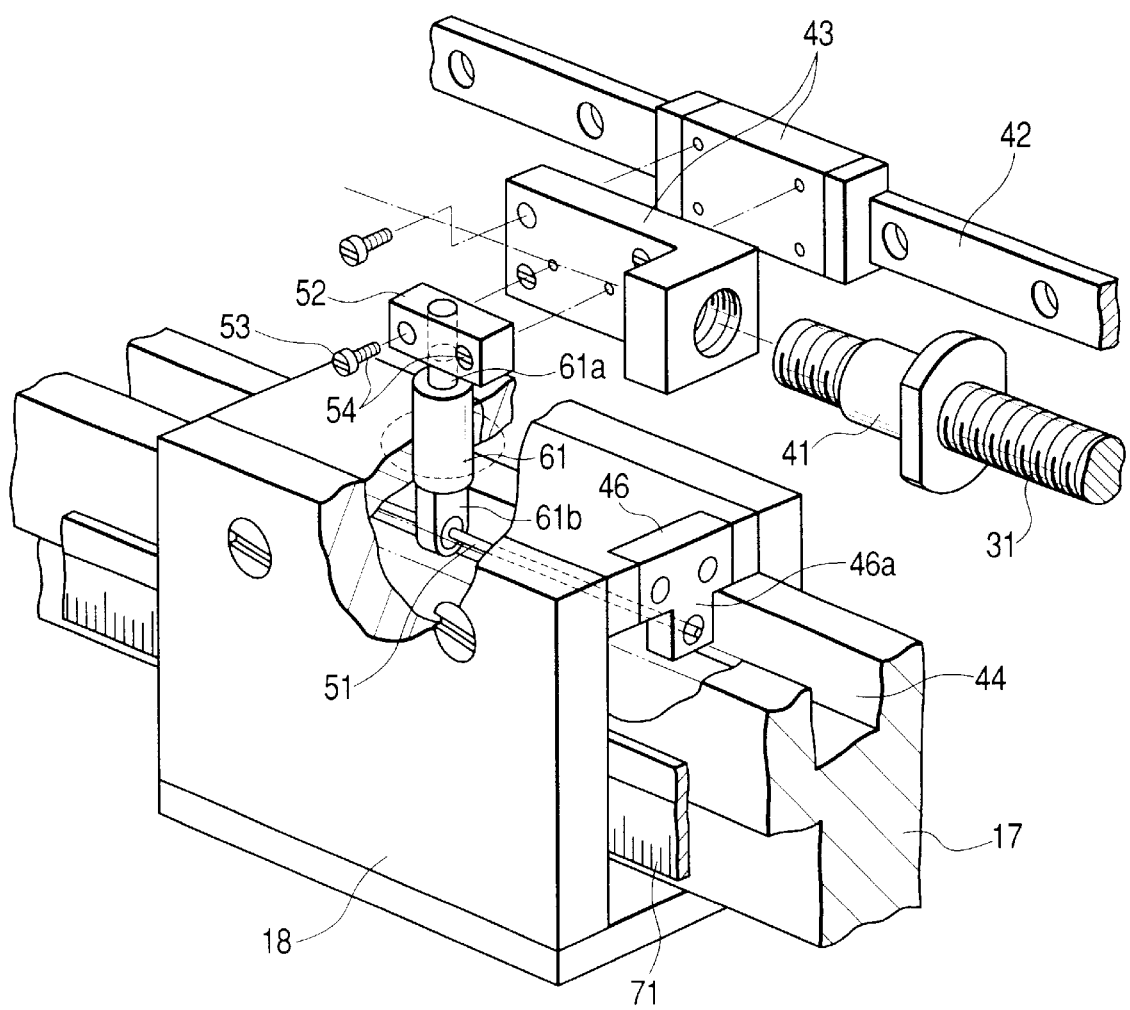
FIG. 4 is an enlarged exploded perspective view of main portions of the surface texture measuring machine.

FIGS. 2, 3 and 4 show the detail of the driving mechanism which is used for feeding the probe C in the X-axis direction (the lateral direction in FIG. 2). Both ends of an X-axis guide 17 which elongates in the lateral direction and which serves as a measurement guide are fixed to the inside of the movable table frame 3 of the vertically movable table E. In the illustrated embodiment, the X-axis guide 17 is configured by a rod-like member which has high workability, high Young's modulus, and a rectangular section shape, and which is made of ceramic, for example, alumina ceramic.

As seen from FIG. 3, a slider 18 which functions as a measurement slider is produced as a rectangular frame surrounding the X-axis guide 17 and is supported so as to be movable along the X-axis guide 17 in the X-axis direction (the lateral direction) The slider 18 is made of ceramic for example.

The slider 18 comprises a plurality of talcs 21, 22, and 23 which slidingly contact the upper and rear side faces of the X-axis guide 17 that serve as reference guide faces. Push units 24 and 25 which press the talcs 21, 22, and 23 against the corresponding reference guide faces are attached to the lower and front side walls of the X-axis guide 17. In the same manner as the push units 7 and 8 which have been described with respect to the slide portion 2, the push units 24 and 25 have a structure which comprises an attachment bushing to be screwingly fixed, and into which a pressing spring for pressing a press head against the surface of the X-axis guide 17 is incorporated.

A box-like detector attaching portion 26 hangs from a lower portion of the slider 18. A displacement detector 27 (FIG. 6) which converts a minute vertical displacement (Z-axis displacement) of the tip end of the probe C attached to the detector into an electric signal is incorporated into the detector attaching portion 26.

As shown in FIG. 2, an X-axis feed screw 31 which elongates in parallel with the X-axis guide 17 is rotatably supported by lateral side walls of the movable table frame 3 with using a pair of bearings 32 and 33. The X-axis feed screw 31 can be manually rotated by an X-axis manual knob 34 which is fixed to an axial end of the screw.

The X-axis feed screw 31 can be rotated also by an X-axis driving motor 35 shown in FIG. 3 via a driving pulley 36 disposed on a driving shaft of the X-axis driving motor 35, a driven pulley 37 at the axial end of the X-axis feed screw 31, and a V belt 38 looped around the driving pulley 36 and the driven pulley 37.

A ball nut 41 into which a large number of balls circulating in a screw groove of the X-axis feed screw 31 are incorporated is screwed with an intermediate portion in the longitudinal direction of the X-axis feed screw 31. The ball nut 41 converts rotational motion of the X-axis feed screw 31 into lateral feed motion.

As shown in FIG. 3, a rigid guide 42 which elongates in parallel with the X-axis feed screw 31, which serves as a drive guide, and which has a rectangular section shape is fixed to the front face of the rear side wall of the movable table frame 3. The rigid guide 42 is formed into a rod-like shape by ceramic of high Young's modulus. A U-like portion of a U-like retainer 43 is fitted onto the rigid guide 42, thereby moving along the rigid guide 42. The U-like retainer 43 is made of ceramic for example. The ball nut 41 is fixed to the U-like retainer 43, thereby suppressing vertical co-rotation of the ball nut 41 due to rotation of the X-axis feed screw 31.

As shown in FIGS. 2 and 4, a top-face groove 44 which elongates in the longitudinal direction of the X-axis guide 17 is formed in the top face of the X-axis guide 17 which faces the ball nut 41. Lower end attaching portions 45a and 46a of a pair of attachment brackets 45 and 46, the basal portions of which are fixed to the left and right ends of the slider 18, are inserted into the top-face groove 44. Both ends of a piano wire piece 51 which straightly elongates in the X-axis direction are fixed between the lower end attaching portions 45a and 46a. The piano wire piece 51 has a property in which it exhibits a large tensile strength in the longitudinal direction and is easily deformed by a load in a direction perpendicular to the longitudinal direction. Therefore, co-rotation of the ball nut 41 which is produced in a plane perpendicular to the longitudinal direction of the piano wire piece 51 can be absorbed.

A connection block 52 is fixed to a lower portion of the U-like retainer 43 by attachment screws 53 and 54. A basal end portion 61a of a vertical connection pin 61 is fixed to the connection block 52, and a lower end portion 61b of the vertical connection pin 61 is secured to an intermediate portion of the piano wire piece 51.

Figure 5:
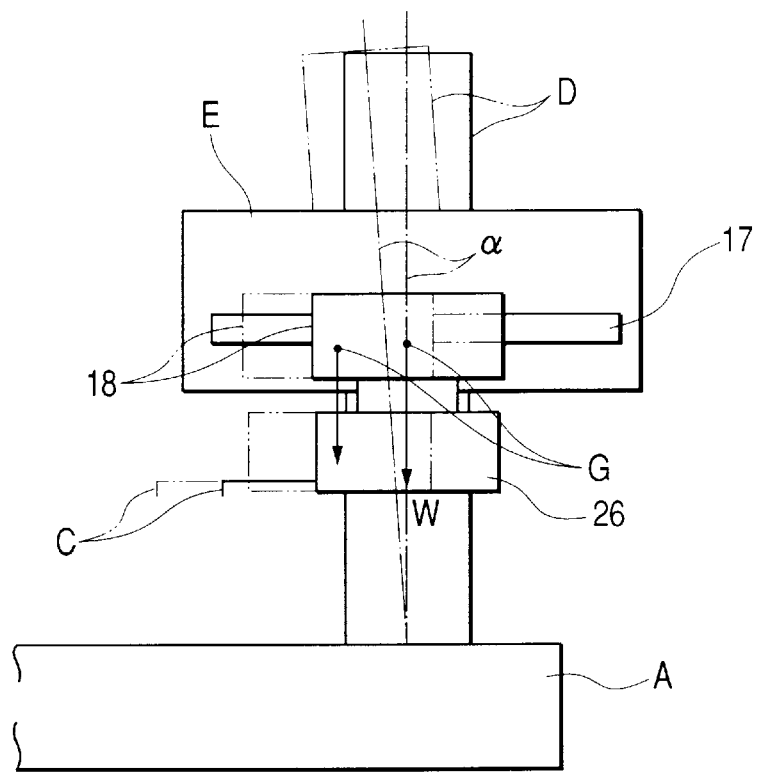
FIG. 5 is a diagram showing a deformation model of a V-axis column of the surface texture measuring machine.

The coupling position of the connection pin 61 with respect to the piano wire piece 51 is the intermediate portion of the piano wire piece 51 corresponding to the position of the center of gravity in the X-axis direction of the slider 18 including the detector attaching portion 26. That is, the lower end portion 61b of the connection pin 61 is secured to the intermediate portion of the piano wire piece 51. During movement of the ball nut 41, therefore, a weight moment about the center of gravity is prevented from acting on the slider 18, i.e., the weight moment is prevented from causing the posture of the slider 18 which is moved along the X-axis feed screw 31, to become instable As shown in FIG. 5, the position of the connection pin 61 is set so that, when the slider 18 is in the center of the longitudinal direction of the X-axis guide 17, the sectional center a of the V-axis column D coincides with the center of gravity G of the slider 18.

This means the following. In the invention, when the slider 18 is moved by x in the lateral direction from the center of the X-axis guide 17 (or the sectional center a of the V-axis column D), a bending moment M, which is obtained by multiplying (the weight W of the slider 18) and (the displacement x in the X-axis direction) together, acts on the V-axis column D which is deemed as a cantilever. The V-axis column D is deformed into a state indicated by the two-dot chain line by the bending moment M, so that deformation of δx is produced in the level of the center of gravity G of the slider 18. When viewed from the machine base A which is a stationary point, the position of the center of gravity G in the X-axis direction of the slider 18 has actually a value of "x+δx".

The precise position of the slider 18 with respect to the X-axis guide 17 can be detected by a laser hologram unit which is disposed between the X-axis guide 17 and the slider 18. The laser hologram unit has a transparent hologram scale 71, a U-like block 72, a laser device 73, and a diffraction photodetector (X-axis detector 74). The transparent hologram scale 71 elongates in the X-axis direction, and is fixed to a lower portion of the front face of the X-axis guide 17. The U-like block 72 is fixed to the lower wall of the slider 18 so as to face the transparent hologram scale 71. The laser device 73 and the diffraction photodetector (X-axis detector 74) are supported by the U-like block 72 in such a manner that they face each other across a lower portion of the transparent hologram scale 71.

In the illustrated embodiment, the surface texture measuring machine is configured as described above. In a state where the tip end of the probe C is brought into contact with the surface of the object on the table B by adjusting the vertical position of the vertically movable table E with respect to the V-axis column D, a minute Z-axis displacement of the probe C is detected while feeding the slider 18 in the X-axis direction, whereby the surface texture such as the two-dimensional surface shape and the surface roughness of the object can be measured.

Namely, the position of the vertically movable table E along the vertical V-axis column D, i.e., the vertical height of the slider 18 can be known by the reflective detector (V-axis detector 13) of the slide portion 2, and the displacement in the X-axis direction of the slider 18, i.e., the X-axis displacement of the probe C can be strictly known by the diffraction photodetector (X-axis detector 74).

Therefore, the surface shape and the surface roughness of the object can be measured by observing a minute displacement in the Z-axis direction of the probe C with respect to the X-axis displacement of the slider 18 with displacement detector 27.

Figure 6:
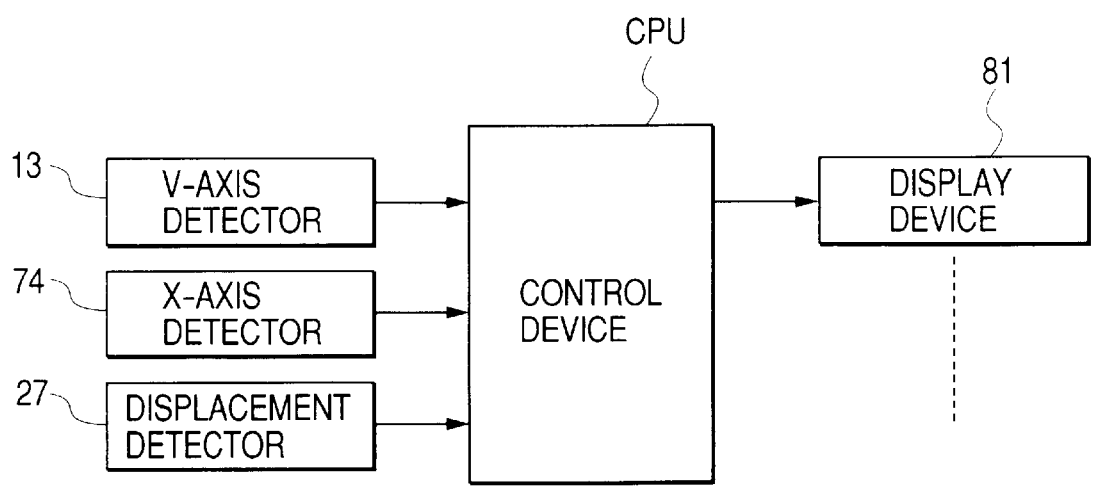
FIG. 6 is a block diagram of the surface texture measuring machine.

FIG. 6 is a block diagram of the signal system of the surface texture measuring machine of the invention. Output signals of the V-axis detector 13, the displacement detector 27 (Z-axis detector), and the X-axis detector 74 which have been described above are supplied to a control device CPU configured by a microcomputer, etc. The control device CPU performs calculations according to the measurement object.

Figure 7:
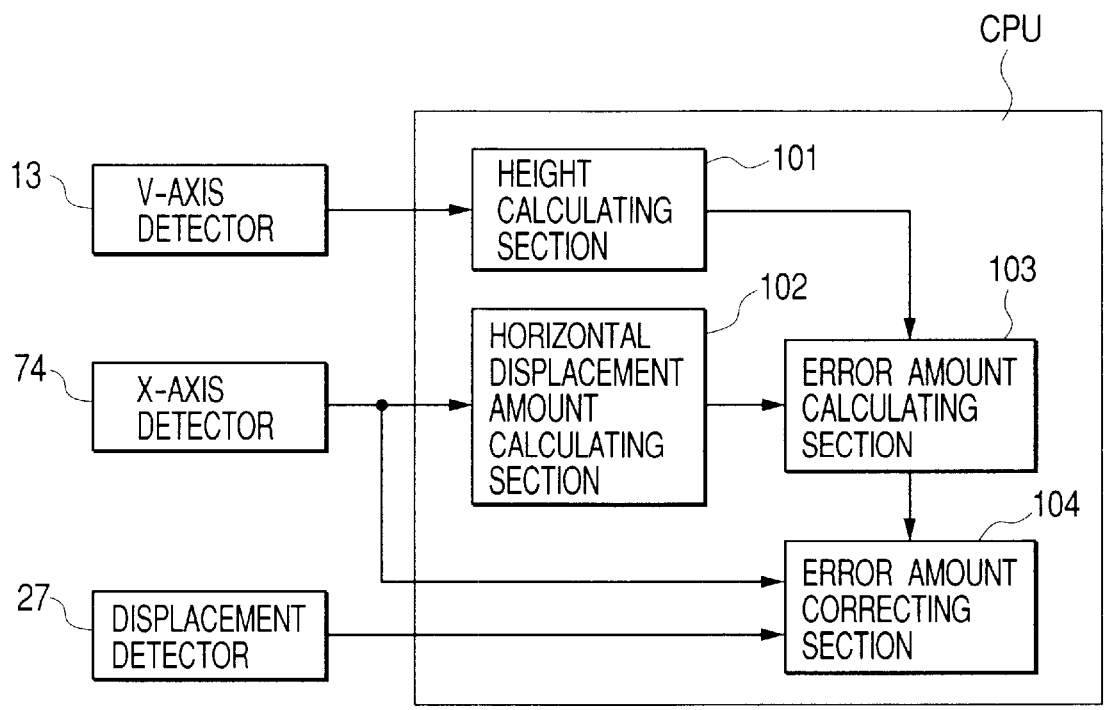
FIG. 7 is a detail block diagram of a control device CPU.

FIG. 7 is a detail block diagram of the control device CPU. A height calculating section 101 calculates the height v from the basal portion of the V-axis column D (the position of the surface of the machine base A) to the reference position of the vertically movable table E (the center of gravity G of the slider 18), from the output of the V-axis detector 13. A horizontal displacement amount calculating section 102 calculates the horizontal displacement amount x of the center of gravity G of the slider 18 with respect to the reference position of the X-axis guide 17 (the sectional center α of the V-axis column D), from the output of the X-axis detector. An error amount calculating section 103 calculates the amount δx of deviation in the X-axis direction of the center of gravity G of the slider 18 due to the bending deformation of the V-axis column D, from the height v and the horizontal displacement amount x and by using the following expression:

$$\delta x = W \cdot x \cdot v \cdot v / (2E \cdot I)$$

where W is the weight (kg) of the slider 18, E is the Young's modulus (N/mm$^2$) of the V-axis column D, and I is the second moment of area of the V-axis column D. Since these values are already known, the error amount δx can be immediately calculated.

The error amount calculating section 103 further calculates the deviation amount δz in the Z-axis direction of the center of gravity G of the slider 18 due to the bending deformation of the V-axis column D, by an expression of δz=v−v×COS γ where γ is the bending angle of the V-axis column D and has a relationship of SINγ=δx/v.

Thereafter, an error amount correcting section 104 subtracts the error amount δx from the output of the X-axis detector 74, and the error amount 6z from the output of the displacement detector 27, thereby correcting the detection values of the axes. Depending on the cases where the center of gravity G of the slider 18 is on the left side or the right side of the sectional center α of the V-axis column D, the sign of the error amount δx is changed.

In the above, the simple method in which the axes are corrected in accordance with the error amount of the position of the center of gravity G of the slider 18 has been described. In the case where errors must be corrected more accurately, the height is calculated with setting the reference position of the vertically movable table E to the work-contact point of the probe C attached to the slider 18. the X-axis guide 17 is inclined by an angle indicated by the above-mentioned value γ by bending deformation of the V-axis column D. In the case where the horizontal position (X-axis position) of the tip end of the probe C must be obtained more correctly, therefore, angle correction may be performed by subtracting the error amount δx from the output of the X-axis detector, then adding the horizontal length from the position of the center of gravity G to the tip end of the probe C to the result of the subtraction, and multiplying the result of the addition with COS γ. With respect to the Z-axis, similar angle correction may be performed.

The results of the calculations by the control device CPU are displayed on display devices 81 in the form of digital values such as the V-axis position of the vertically movable table E, the X-axis position of the slider 18, and. the minute displacement (in the V-axis direction). In addition to the display devices 81, a computer which analyzes the measurement data, and a CRT display device which can display results of the analyses in the form of graphs may be used.

Figure 8:
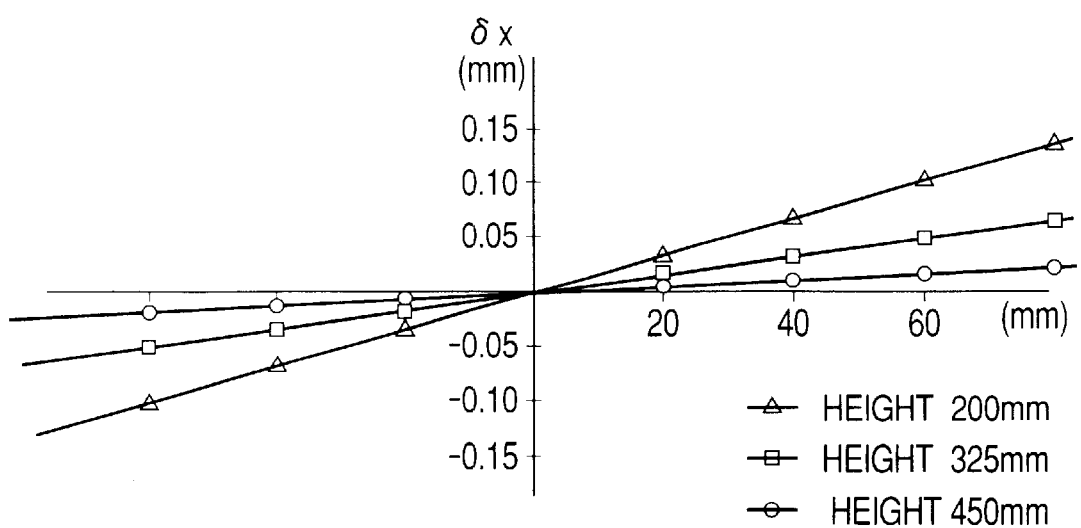
FIG. 8 is a graph of correction of an X-axis position by deformation of the V-axis column.

FIG. 8 shows relationships between the correction value δx in the surface texture measuring machine and the position in the X-axis direction of the slider 18 in the case where the weight W of the slider 18 of the surface texture measuring machine is 4.5 kg, the Young's modulus E of the V-axis column D is 225,000 N/mm$^2$, and the second moment I of area of the V-axis column D is 1E+07 mm$^4$.

As seen from FIG. 8, the error amount δx is larger as the adjustment height of the vertically movable table E with respect to the V-axis column D is larger, and as the weight of the slider 18 and the X-axis displacement x are larger. Therefore, the following will be understood. In order to precisely measure an object of a large size, it is more advantageous to obtain the X-axis position by calculation of the correction value δx without causing the weight of the machine to be increased by enhancement of the rigidity of the V-axis column D, and at a certain sacrifice of the rigidity of the V-axis column D.

Figure 9:
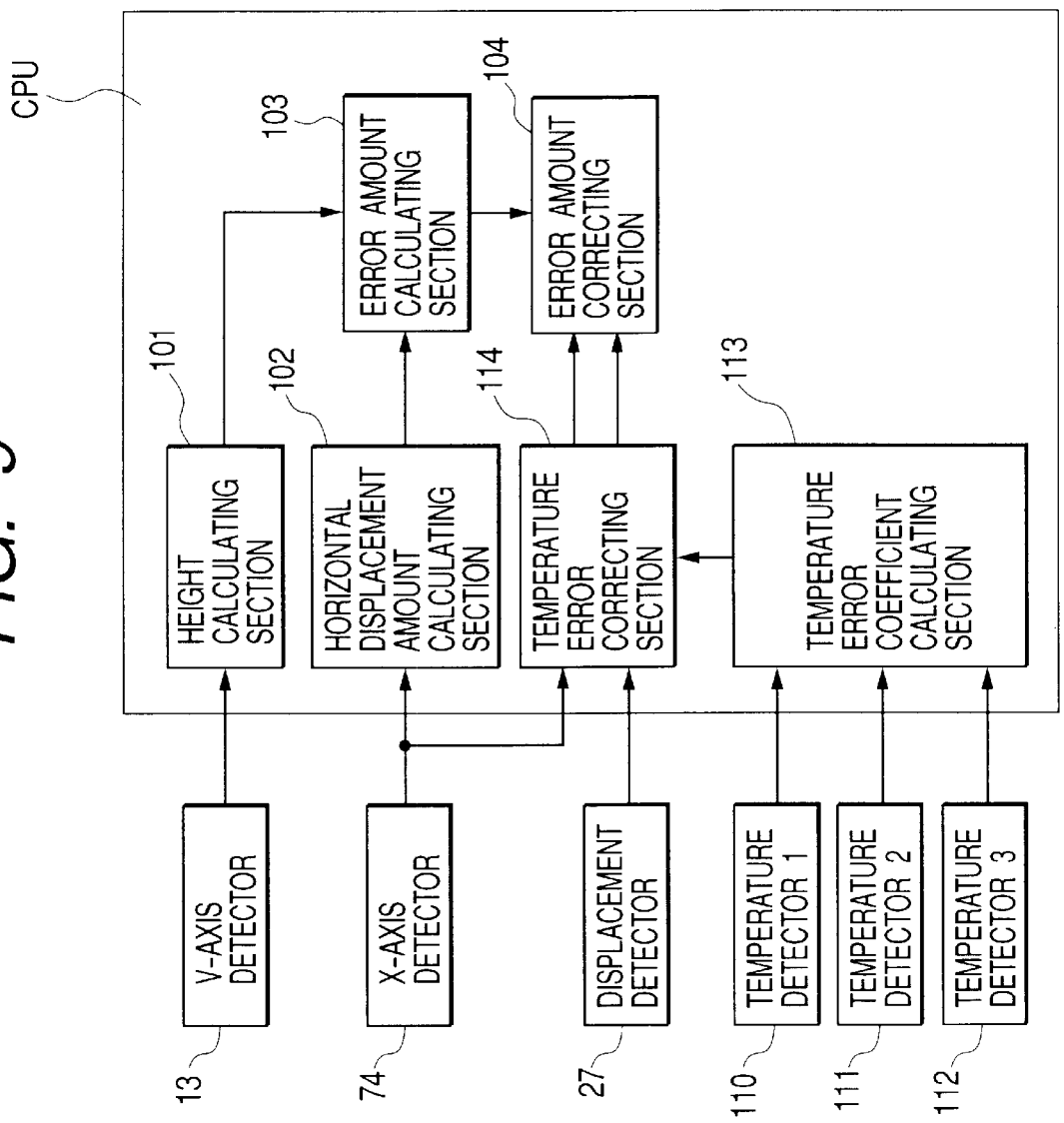
FIG. 9 is a detail block diagram of a control device CPU in another embodiment.

FIG. 9 shows another embodiment in which a temperature detector is disposed in the first embodiment, and a temperature error coefficient calculating section and a temperature error correcting section are disposed in the control device CPU in order to correct extension or contraction of the axis detectors and the object due to the temperature. Referring to the figure, a temperature detector-1 is placed in the vicinity of the hologram scale 71 of the X-axis detector 74, a temperature detector-2 is placed in the vicinity of the displacement detector 27, and a temperature detector-3 is placed in the vicinity of the object, so that the temperatures of the X-axis detector 74, the displacement detector 27, and the object are detected.

Results of the temperature detections are supplied to the temperature error coefficient calculating section disposed in the control device CPU. A temperature error amount is obtained in the following manner. Usually, the standard temperature is set to 20 degrees centigrade. Therefore, the temperature difference with respect to 20 degrees centigrade, or Tw=Tc−20 is obtained. The difference Tw is multiplied with the coefficient of linear expansion β to obtain the temperature error amount. Specifically, in the case where the temperature in the vicinity of the hologram scale 71 of the X-axis detector 74 is T1 and the coefficient of linear expansion of the hologram scale 71 is β1, a temperature error coefficient θ1 of the X-axis detector 74 is obtained as θ1=β1×(T1−20). The thus obtained temperature error coefficients are supplied to the temperature error correcting section 114 and temperature error correction is then performed on the axes or the object.

In the case of the X-axis detector 74, with respect to the X-axis detection amount X, a temperature-corrected detection amount Xc is obtained as Xc=X×(1−θ1). With respect to the displacement detector 27 also, a temperature-corrected amount can be calculated in the same manner except that the coefficient of linear expansion of the displacement detector 27 is indicated by β2. With respect to the object also, a temperature-corrected amount can be calculated in the same manner except that the coefficient of linear expansion of the object is indicated by β3. It is a matter of course that the coefficient of linear expansion β3 of the object must be set for each of objects which are to be measured.

Depending on the degree of the effect of the temperature, temperature correction may be performed only on, for example, the X-axis detector. The object of temperature correction can be arbitrarily selected.

As described above, the temperatures of the axis detectors are independently measured as required, and temperature correction is then performed, whereby correct detection amounts converted to 20 degrees centigrade which is the industrial standard state can be obtained. When temperature correction is further performed on the object, it is possible to more correctly obtain the surface texture of the object which is converted to 20 degrees centigrade.

As seen from the above description, according to the invention, a correction value is calculated in accordance with the height of the vertically movable table, and the displacement in the X-axis direction of the slider, and the actual X-axis displacement is obtained from the correction value. Therefore, it is possible to obtain a surface texture measuring machine which is relatively light and can be used for measuring a large object, or which has high precision.

Furthermore, temperature detectors are disposed in the axis detectors and the object to measure the temperatures thereof, and detection values are then corrected, whereby the correct surface texture of the object converted to 20 degrees centigrade which is the industrial standard state can be obtained.

What is claimed is:

1. A method of correcting a measured value for a surface texture measuring machine comprising: a column which upstands from a base of said machine; a vertically movable table which is supported to be vertically movable with respect to said column; a V-axis detector which detects a vertical displacement amount of said vertically movable table with respect to said column; a horizontal X-axis guide which is disposed on said vertically movable table; a slider which is guided along said X-axis guide and which has a Z-axis detector that detects a surface texture of an object; and an X-axis detector which detects a horizontal displacement amount of said slider with respect to said X-axis guide, said method comprising:

an error calculation step of calculating amounts of errors in X-axis and Z-axis directions at a reference position of said vertically movable table, the errors being due to deformation of said column, from a height from a basal portion of said column to the reference position of said vertically movable table, the height being obtained by said V-axis detector, and a horizontal displacement amount from a reference position of said X-axis guide to a position of a center of gravity of said slider, the horizontal displacement amount being obtained by said X-axis detector; and an error correction step of correcting a detection result of at least one of said X-axis detector and said Z-axis detector, in accordance with the amounts of errors obtained in said error calculation step.

2. The method of correcting the measured value according to claim 1, said method further comprising:

a temperature error coefficient calculation step of obtaining a temperature error coefficient from an output of temperature detector disposed in the vicinity of at least one of said X-axis detector, said Z-axis detector, and said object, and specific temperature characteristics of said X-axis detector, said Z-axis detector, or said object in which said temperature detector is disposed; and a temperature error correction step of correcting the detection result of at least one of said X-axis detector, said Z-axis detector, and said object, in accordance with the temperature error coefficient obtained in said temperature error coefficient calculation step.

3. The method of correcting the measured value according to claim 1, wherein the reference position of said vertically movable table is a position of a center of gravity of the slider.

4. The method of correcting the measured value according to claim 1, wherein the reference position of said vertically movable table is an object-contact point of Z-axis detector of the slider.

5. The method of correcting the measured value according to claim 1, wherein the error calculation step calculates amounts of errors in X-axis and Z-axis directions at the reference position of said vertically movable table, the errors being due to deformation of said column, further from a horizontal length from the position of the center of gravity of the slider to a tip end of the Z-axis detector.

6. A surface texture measuring machine comprising:
a column which upstands from a base of said machine;
a vertically movable table which is supported to be vertically movable with respect to said column;
a V-axis detector which detects a vertical displacement amount of said vertically movable table with respect to said column;
a horizontal X-axis guide which is disposed on said vertically movable table;
a slider which is guided along said X-axis guide, and which has a Z-axis detector that detects a surface texture of an object;
an X-axis detector which detects a horizontal displacement amount of said slider with respect to said X-axis guide; and
a control device for correcting a detection result of at least one of said X-axis detector and said Z-axis detector, the control device including:
a height calculating section for receiving an output of said V-axis detector, and for calculating a height from a basal portion of said column to a reference position of said vertically movable table;
a horizontal displacement amount calculating section for receiving an output of said X-axis detector, and for calculating a horizontal displacement amount from a reference position of said X-axis guide to a position of a center of gravity of said slider;
an error amount calculating section for receiving outputs of said height calculating section and said horizontal displacement amount calculating section, and for calculating an amount of an error in at least one of X-axis and Z-axis directions at the reference position of said vertically movable table, the error being due to deformation of said column; and
an error amount correcting section for correcting a detection result of at least one of said X-axis detector and said Z-axis detector, in accordance with an output of said error amount calculating section.

7. The surface texture measuring machine according to claim 6, further comprising:

a temperature detector disposed in the vicinity of at least one of X-axis detector, Z-axis detector and the object, wherein said control device further includes:

a temperature error coefficient calculating section for obtaining a temperature error coefficient from an output of the temperature detector and specific temperature characteristics of said X-axis detector, said Z-axis detector, or said object in which said temperature detector is disposed; and a temperature error correcting section for correcting the detection result of at least one of said X-axis detector, said Z-axis detector, and said object, in accordance with an output of said temperature error coefficient calculating section.

8. The surface texture measuring machine according to claim 6, wherein the reference position of said vertically movable table is a position of a center of gravity of the slider.

9. The surface texture measuring machine according to claim 6, wherein the reference position of said vertically movable table is an object-contact point of Z-axis axis detector of the slider.

10. The surface texture measuring machine according to claim 6, wherein the error calculation section calculates amounts of errors in X-axis and Z-axis directions at the reference position of said vertically movable table, the errors being due to deformation of said column, further from a horizontal length from the position of the center of gravity of the slider to a tip end of the Z-axis detector.

* * * * *